(12) United States Patent
Salter et al.

(10) Patent No.: US 12,617,287 B2
(45) Date of Patent: May 5, 2026

(54) VEHICLE WITH ELECTRIFIED CHARGING TRAILER CONTROL

(71) Applicant: Ford Global Technologies, LLC, Dearborn, MI (US)

(72) Inventors: Stuart C. Salter, White Lake, MI (US); Michael Kipley, Saline, MI (US); Matthew Simpson, Grosse Pointe Shores, MI (US); Ryan O'Gorman, Beverly Hills, MI (US); Pietro Buttolo, Dearborn Heights, MI (US); Peter Phung, Windsor (CA); William David Treharne, Ypsilanti, MI (US)

(73) Assignee: FORD GLOBAL TECHNOLOGIES, LLC, Dearborn, MI (US)

(*) Notice: Subject to any disclaimer, the term of this patent is extended or adjusted under 35 U.S.C. 154(b) by 607 days.

(21) Appl. No.: 17/861,765

(22) Filed: Jul. 11, 2022

(65) Prior Publication Data

US 2024/0010074 A1     Jan. 11, 2024

(51) Int. Cl.
| | |
|---|---|
| *B60L 7/10* | (2006.01) |
| *B60Q 9/00* | (2006.01) |
| *H02J 7/82* | (2026.01) |
| *H02J 7/90* | (2026.01) |

(52) U.S. Cl.
CPC ................. *B60L 7/10* (2013.01); *B60Q 9/00* (2013.01); *H02J 7/82* (2026.01); *H02J 7/933* (2026.01); *B60L 2200/28* (2013.01)

(58) Field of Classification Search
None
See application file for complete search history.

(56) References Cited

U.S. PATENT DOCUMENTS

| | | | | |
|---|---|---|---|---|
| 7,281,770 B1 * | 10/2007 | Curran | ...................... | B60T 1/10 |
| | | | | 303/151 |
| 9,857,255 B2 | 1/2018 | Hagan | | |
| 10,628,904 B2 | 4/2020 | Ortiz et al. | | |
| 10,737,583 B2 | 8/2020 | Johnsen et al. | | |
| 2017/0174206 A1 * | 6/2017 | Laing | .................... | B60W 10/06 |
| 2018/0026457 A1 * | 1/2018 | Delevski | ............... | H02J 7/0024 |
| | | | | 320/106 |
| 2019/0233034 A1 | 8/2019 | Viele et al. | | |
| 2020/0001732 A1 | 1/2020 | Nohra et al. | | |
| 2020/0119581 A1 * | 4/2020 | Kim | ....................... | H02J 7/0068 |
| 2023/0125484 A1 * | 4/2023 | Lavertu | ................. | B60W 20/12 |
| | | | | 701/22 |

(Continued)

*Primary Examiner* — Hongye Liang
(74) *Attorney, Agent, or Firm* — David B. Kelley; Brooks Kushman P.C.

(57) ABSTRACT

A vehicle configurable to tow a charging trailer having at least one electric outlet configured to charge a battery powered device includes a human-machine interface (HMI), a wireless transceiver, and a controller in communication with the wireless transceiver and the HMI, the controller programmed to, in response to the wireless transceiver receiving signals associated with at least one battery powered device in a connected charging trailer having a battery state of charge (SOC) below a corresponding threshold, signal the HMI to generate an associated output. Input from the HMI may enable or disable regenerative braking of the charging trailer to charge connected battery powered devices to control the associated effect of the charging of devices in the charging trailer on efficiency of the towing vehicle.

2 Claims, 3 Drawing Sheets

(56) References Cited

U.S. PATENT DOCUMENTS

| 2023/0311678 A1 * | 10/2023 | Paryani | B60L 53/10 |
| | | | 307/10.7 |
| 2023/0369880 A1 * | 11/2023 | Koenen | B60P 1/435 |
| 2025/0219427 A1 * | 7/2025 | Singvall | H02J 7/00712 |

* cited by examiner

VEHICLE WITH ELECTRIFIED CHARGING TRAILER CONTROL

TECHNICAL FIELD

This disclosure relates to a vehicle system and method for use in operation of an electrified charging trailer capable of charging battery powered devices, such as tools and recreational vehicles, as the trailer is towed by the vehicle.

BACKGROUND

Various types of commercially available charging trailers may be used to transport and charge electric utility vehicles, ATV's, e-bikes, tools, lifts, etc. The charging trailers may include one or more electric machines and batteries. The electric machine may operate as a traction motor to power wheels of the trailer, and/or as a generator that may be used to charge the trailer battery and connected battery-powered devices carried by the trailer. Operation of the electric machine as a generator while being towed by a vehicle may affect the vehicle operation and efficiency, as well as associated trip planning.

SUMMARY

A vehicle with electrified charging trailer control can recognize objects/vehicles and associated battery state of charge (SOC) within the trailer and can prompt within the vehicle to enable a power generation feature and/or to connect battery powered devices within the trailer so they can be charged during travel. The vehicle system may provide for configuration of various parameters, such as a minimum SOC to prompt for connection, or whether to prompt to switch devices when a connected device reaches a specified SOC, a level for trailer regenerative braking and associated effect on vehicle range, efficiency, or fuel, etc. The vehicle may control the power generation feature of the trailer based on a predicted vehicle destination, route, travel time, or recommended charge level of the trailer battery or one or more devices carried by the trailer, for example. The vehicle may a conventional internal combustion engine vehicle, or may be an electrified vehicle, including a hybrid, plug-in hybrid, or battery electric vehicle.

In various embodiments, a vehicle configurable to tow a charging trailer having at least one electric outlet configured to charge a battery powered device includes a human-machine interface (HMI), a wireless transceiver, and a controller in communication with the wireless transceiver and the HMI, the controller programmed to, in response to the wireless transceiver receiving signals associated with at least one battery powered device in a connected charging trailer having a battery state of charge (SOC) below a corresponding threshold, signal the HMI to generate an associated output. The wireless transceiver may include a Bluetooth, Bluetooth Low Energy (BLE), WiFi, Zigbee, RFID, or similar transceiver. The wireless transceiver may receive signals from a wireless transceiver mounted in the trailer, which in turn communicates with the at least one battery powered device to determine the battery SOC of the device. The vehicle may be a conventional internal combustion engine vehicle, or an electrified vehicle having a traction battery powering an electric machine to provide propulsive torque to vehicle wheels. Electrified vehicles may include a hybrid, plug-in hybrid, or battery electric vehicle. The controller may be further programmed to transmit a signal via the wireless transceiver to enable regenerative braking of the charging trailer in response to input received via the vehicle HMI.

In one or more embodiments, the vehicle controller may be further programmed to signal the vehicle HMI to generate an associated output in response to receiving a signal via the transceiver indicating the at least one battery powered device has an SOC exceeding an associated threshold. The associated output may prompt the user to disable regenerative braking of the charging trailer associated with charging battery powered devices in the trailer. The controller may be further programmed to signal the HMI to generate an associated output in response to receiving a signal via the transceiver indicating the at least one battery powered device is disconnected from the at least one electric outlet. The HMI may prompt the user to connect or plug-in the disconnected device in the trailer for charging. The controller may determine whether the device has a battery SOC below an associated threshold, and only generate the HMI prompt if the disconnected device has an SOC below the threshold. The controller may be further programmed to signal the HMI to generate the associated output in response to detecting movement of the vehicle when a charging trailer is hitched or electrically connected to the vehicle.

Embodiments may also include a vehicle controller programmed to signal the HMI to generate the associated output in response to receiving a signal indicating closed doors of a connected charging trailer and the at least one battery powered device being disconnected from the at least one electric outlet. The controller may be further programmed to transmit a signal via the wireless transceiver to disable regenerative braking of the charging trailer in response to receiving a signal via the wireless transceiver associated with all of the at least one battery powered device having an SOC above the corresponding threshold. The controller may be further programmed to transmit a signal via the wireless transceiver to enable or disable regenerative braking of the charging trailer in response to a vehicle destination entered via the HMI. A vehicle destination corresponding to a stored "home" address may disable regenerative braking while a vehicle destination corresponding to a stored "cottage" or "cabin" address or a recognized hotel, park, or other tourist destination may enable regenerative braking. The controller may be further programmed to signal the HMI to generate an associated output responsive to SOC of the at least one battery powered device exceeding the corresponding threshold and detecting another of the at least one battery powered device having an SOC below the corresponding threshold and being disconnected from the at least one electrical outlet.

Embodiments may also include a method performed by a vehicle controller that includes detecting a state of charge (SOC) of at least one battery powered device in a charging trailer being below a corresponding SOC threshold, the SOC being wirelessly transmitted by the at least one battery powered device, and in response to the detecting, generating a prompt on a vehicle human-machine interface (HMI) to enable charging of the at least one battery powered device. Enabling charging may include transmitting a signal to a charging trailer to enable regenerative braking of the charging trailer to charge one or more devices connected to electrical outlets within the trailer. The method may include controlling a vehicle transceiver in communication with the vehicle controller to transmit a signal enabling regenerative braking of the charging trailer in response to input from the HMI received after generating the prompt. The method may further include controlling a vehicle transceiver in communication with the vehicle controller to transmit a signal disabling regenerative braking of the charging trailer in response to receiving a signal via the vehicle transceiver indicating SOC of battery powered devices in the charging trailer exceeds a corresponding SOC threshold. In various embodiments, the method includes generating a prompt on the vehicle HMI to disable regenerative braking of the charging trailer in response to detecting SOC of at least one battery powered device in the charging trailer exceeding the SOC threshold. The method may also include generating a prompt on the vehicle HMI to enable or disable regenerative braking of the charging trailer in response to input from the vehicle HMI designating a destination associated with enabling or disabling regenerative braking.

Various embodiments include a system comprising a vehicle configured to tow a charging trailer, a human-machine interface (HMI) within the vehicle, a transceiver within the vehicle configured to receive wireless signals from battery powered devices within the charging trailer indicated an associated battery state of charge (SOC), and a controller programmed to control the HMI to generate a prompt to enable regenerative braking of the charging trailer in response to SOC of one or more of the battery powered devices being below a corresponding threshold. The system may include a controller programmed to control the HMI to generate a prompt to disable regenerative braking of the charging trailer in response to all of the battery powered devices having an SOC exceed the corresponding threshold. The controller may be further programmed to control the HMI to generate a prompt in response to detecting at least one of the battery powered devices being disconnected from an electrical outlet of the charging trailer.

One or more embodiments according to the disclosure may have associated advantages. For example, embodiments may prompt a vehicle operator to enable regenerative braking of a charging trailer in response to detecting battery powered devices that need charging and/or are disconnected from outlets in the charging trailer. The vehicle operator may be prompted to disable regenerative braking when all devices being transported are charged to a designated SOC to reduce the effect of trailer regenerative braking on the towing vehicle range, efficiency, or fuel economy.

DETAILED DESCRIPTION

Embodiments of the present disclosure are described herein. It is to be understood, however, that the disclosed embodiments are merely examples and other embodiments can take various and alternative forms. The figures are not necessarily to scale and may be simplified; some features could be exaggerated, minimized, or omitted to show details of particular components. Therefore, specific structural and functional details disclosed herein are not to be interpreted as limiting, but merely as a representative basis for teaching one skilled in the art to variously employ the claimed subject matter. As those of ordinary skill in the art will understand, various features illustrated and described with reference to any one of the figures can be combined with features illustrated in one or more other figures to produce embodiments that are not explicitly illustrated or described, but within the scope of the claimed subject matter. The combinations of features illustrated provide representative embodiments for typical applications. Various combinations and modifications of the features consistent with the teachings of this disclosure, however, could be desired for particular applications or implementations.

Figure 1:
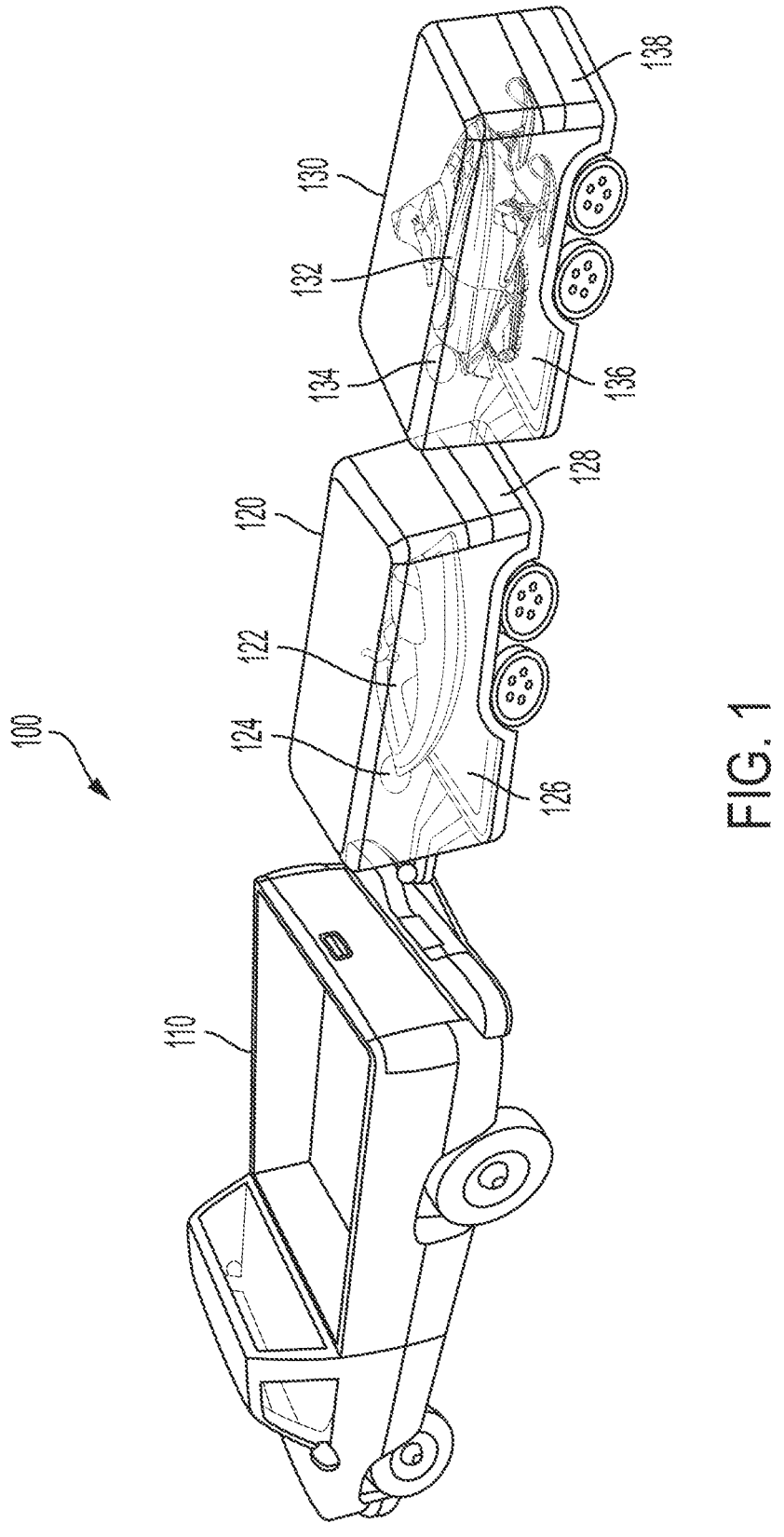
FIG. 1 illustrates a vehicle towing electrified charging trailers transporting battery powered devices.

FIG. 1 illustrates a vehicle towing electrified charging trailers transporting battery powered devices. System 100 includes a vehicle 110 configurable to tow at least one electrified charging trailer 120. Vehicle 110 may be a conventional vehicle powered by an internal combustion engine, or an electrified vehicle, such as a hybrid, plug-in hybrid, or battery electric vehicle. In the representative embodiment illustrated in FIG. 1, a second electrified charging trailer 130 is towed behind the first electrified charging trailer 120. Electrified charging trailers 120, 130 are configured to transport and charge one or more electric battery powered devices 122, 132 which may include electric utility vehicles, ATV's, e-bikes, tools, lifts, etc. In the representative embodiment illustrated, each electrified charging trailer 120, 130 contains a single battery powered device, such as a personal watercraft or jet ski 122 and a snowmobile 132, accessible via a loading door (or doors) 128, 138, respectively, that trigger a respective door sensor or switch when closed or locked, for example.

Each electrified charging trailer 120, 130 may be configured to transport and charge more than one battery powered device, and may accommodate battery powered devices having various charging requirements, battery sizes, etc. via associated outlets 124, 134, respectively. Trailers 120, 130 may include additional charging system components 126, 136 as illustrated and described with reference to FIG. 2.

Figure 2:
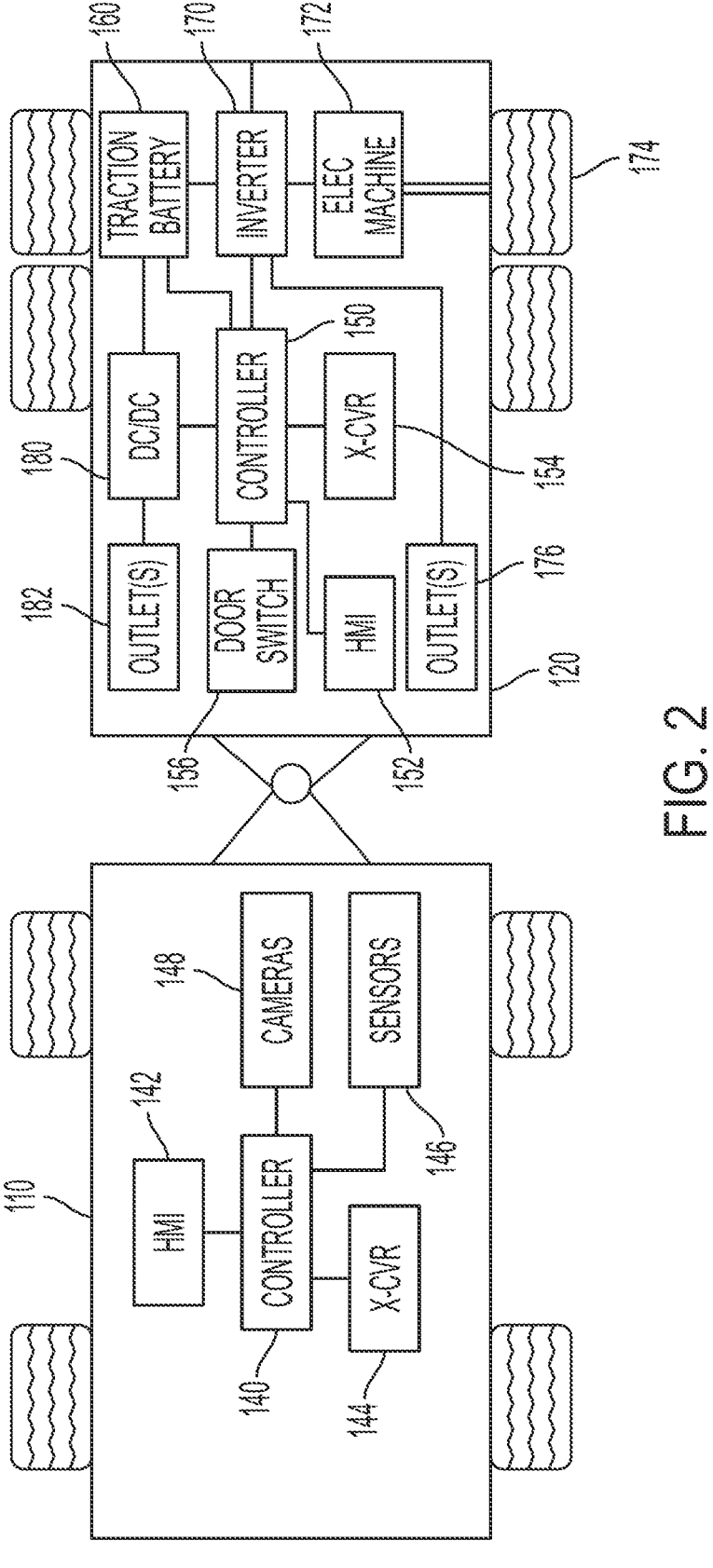
FIG. 2 is a block diagram of a vehicle towing an electrified charging trailer.

FIG. 2 is a block diagram of a vehicle towing an electrified charging trailer. With reference to FIGS. 1 and 2, vehicle 110 includes a controller 140 in communication with a human-machine interface (HMI) 142, a wireless transceiver 144, one or more sensors 146, and one or more cameras 148. Various vehicle systems and controllers have been omitted in the simplified block diagram of FIG. 2 for ease of illustration and description. However, those of ordinary skill in the art will understand that controller 140 or other vehicle controllers or control modules may communicate with one another over a wired or wireless vehicle network to distribute processing tasks and functions based on data generated by numerous sensors, systems, components, etc. that may include a vehicle engine, transmission, electric machines, traction battery, auxiliary battery, power conversion module (inverter), power electronics, and various other control modules, components, or systems.

HMI 142 may generate output including audio, visual, and/or haptic output in response to commands or signals from controller 140. HMI 142 may receive input from a vehicle user or operator and provide associated signals to controller 140 to control one or more vehicle functions and set various preferences, thresholds, parameters, etc. for vehicle components or systems as well as third-party devices that may communicate via wired or wireless connections by way of transceiver 144. Third-party devices may include smart phones, tablets, or other smart devices as well as devices that have limited functionality, such as transmitting a location, ID, or battery state of charge (SOC), for example. Smart devices may include battery powered devices within the vehicle cabin, as well as devices within a predetermined proximity of the vehicle, such as devices within a connected trailer 120, 130. In various embodiments, HMI 142 is used to set preferences and control operation of a third-party charging trailer 120 for charging of battery powered devices 122, 132, as described herein. HMI 142 may include a display or touch screen as well as one or more knobs, buttons, sliders, speakers, buzzers, etc. to provide input/output.

Wireless transceiver 144 provides wireless communication with coupled, linked, or paired devices using one or more commercially available or proprietary communication strategies that may include Bluetooth, Bluetooth Low Energy (BLE), Wi-Fi, Zigbee, RFID, and similar strategies or technologies generally known in the art. One or more sensors 146 may detect an electrical connection between vehicle 110 and electrified charging trailer 120. Sensors 146 may include a force sensor or similar sensor to detect connection of a trailer 120 to vehicle 110. One or more cameras 148 may include a rear-view or side-view camera that may be used to detect connection of trailer 120 and/or trailer 130 to vehicle 110. Sensors 146 and cameras 148 may provide data to controller 140 to detect a connected trailer 120, 130. Alternatively or in combination, HMI 142 may be used to prompt a user for confirmation of a connected charging trailer 120, 130 in response to receiving a signal via transceiver 144 or detecting a trailer via sensors 146 and/or cameras 148. The user may also indicate via HMI 142 that an electrified charging trailer has been hitched or connected to the vehicle.

Electrified charging trailer 120 includes a controller 150 in communication with an HMI 152, transceiver 154, and loading door(s) switch or sensor(s) 156. Controller 150 may also communication with a traction battery 160, power conversion electronics or inverter 170, one or more electric machine(s) 172, and a DC/DC converter 180. Inverter 170 is connected to traction battery 60 and converts DC power to AC power provided to one or more electric machines 172. Inverter 170 may also supply AC power to one or more outlets 176 to power portable devices. Inverter 170 may provide single phase or multi-phase power to electric machine 172, and may provide different voltage/current to electric machine 172 than AC outlet(s) 176. DC/DC converter 180 may convert DC power from traction battery 160 to power one or more outlet(s) 182 for charging of battery powered vehicles 122, tools, or other devices being transported by trailer 120. Outlet(s) 120, 182 may be configured to receive various types of plugs depending on the particular power provided to charge compatible battery powered devices.

HMI 152 may be used to select user preferences for control of the electrified charging trailer 120. Transceiver 154 may provide wireless communication with transceiver 144 of vehicle 110 and/or communication with one or more compatible battery powered devices being transported by trailer 120. Alternatively, or in combination, battery powered devices 122 may communicate directly with vehicle transceiver 144 depending on the particular application and implementation.

In various implementations of an electrified charging trailer 120, controller 150 may control operation of electric machine(s) 172 coupled to associated trailer wheels 174 to operate as a generator providing regenerative braking to mechanically coupled trailer wheels 174 and electric power through inverter 170 that may be used to charge traction battery 160 and/or battery powered devices connected to outlet(s) 176, 182. Controller 150 may detect the presence of one or more battery powered devices 122 using various proprietary or commercially available wireless communication strategies or technology, such as Bluetooth, BLE, Zigbee, Wi-Fi, etc. Controller 150 may also determine which of the detected battery powered devices are currently connected to one of outlet(s) 176, 182 via wireless communication to determine the corresponding device battery state of charge (SOC) and/or by monitoring current/voltage for outlet(s) 176, 182. Trailer controller 150 may receive a signal from a wired or wireless communication with vehicle controller 140 to enable or disable regenerative braking to charge traction battery 160 and/or connected battery powered devices.

As illustrated in FIGS. 1 and 2, vehicle 110 is configurable to tow an electrified charging trailer 120 having at least one electric outlet 124, 176, 182, configured to charge a battery powered device 122. Vehicle 110 includes an HMI 142 and a wireless transceiver 144 in communication with a controller 140. The controller 140 is programed to, in response to wireless transceiver 144 receiving signals associated with at least one battery powered device 122 in a connected charging trailer 120 having a battery state of charge (SOC) below a corresponding threshold, signal HMI 142 to generate an associated output. The associated output may prompt a vehicle user for input to enable the charging system 126 of trailer 124. Trailer controller 150 may then enable operation of electric machine 172 as a generator to provide regenerative braking (continuously or as needed depending on the SOC of traction battery 160) to charge traction battery 160 and/or battery powered device 122. Transceiver 144 may receive the signals associated with device 122 directly from device 122, or via trailer transceiver 154. The signals may indicate the battery SOC of device 122 or whether the battery is charging or discharging, for example.

Vehicle controller 140 may be programmed to implement a trip/route planner. The trip/route planner may include stored or downloaded road data and associated maps. Stored data may include GPS or address information for various types of destinations. For example, stored data may correspond or be associated with a "home" or "work" or "cottage" or "cabin" identifier. HMI 142 may be used to enter and store destinations in an associated memory. The stored destinations may have a default status with respect to electrified charging trailer settings or preferences, such as whether to enable regenerative braking, which lowers vehicle efficiency and range and has an associated effect on vehicle fuel. As such, when a "home" destination is selected for a trip, controller 140 may disable regenerative braking of a connected electrified charging trailer 120 via communication with controller 150. Similarly, when a "cottage" destination or a "jobsite" destination is selected for a trip, controller 140 may enable regenerative braking of trailer 120 so that all of the transported battery powered devices are charging during transit. The trip planner feature or function may cooperate with the electrified charging trailer power function to provide a predictive mode for regenerative braking, such as when the rout includes potential opportunities to generate regenerative braking power that does not affect the vehicle efficiency, i.e. downhill or down grade locations.

In some embodiments, the trip planner may also cooperate with the charging control to recommend a stop along the route to allow connection of unconnected battery powered devices. For example, a stop could be recommended because the trailer 120 identifies a transported battery powered device 122 will reach a target or threshold SOC in x number of minutes, and another device not currently connected to a charging outlet is below a threshold SOC, i.e. the trailer contains two or more identified devices that require charge, or contains more devices than the number of compatible charging outlets, and recommends a stop to rotate or switch plugged in devices with unplugged devices so that all transported devices can be charged.

Figure 3:
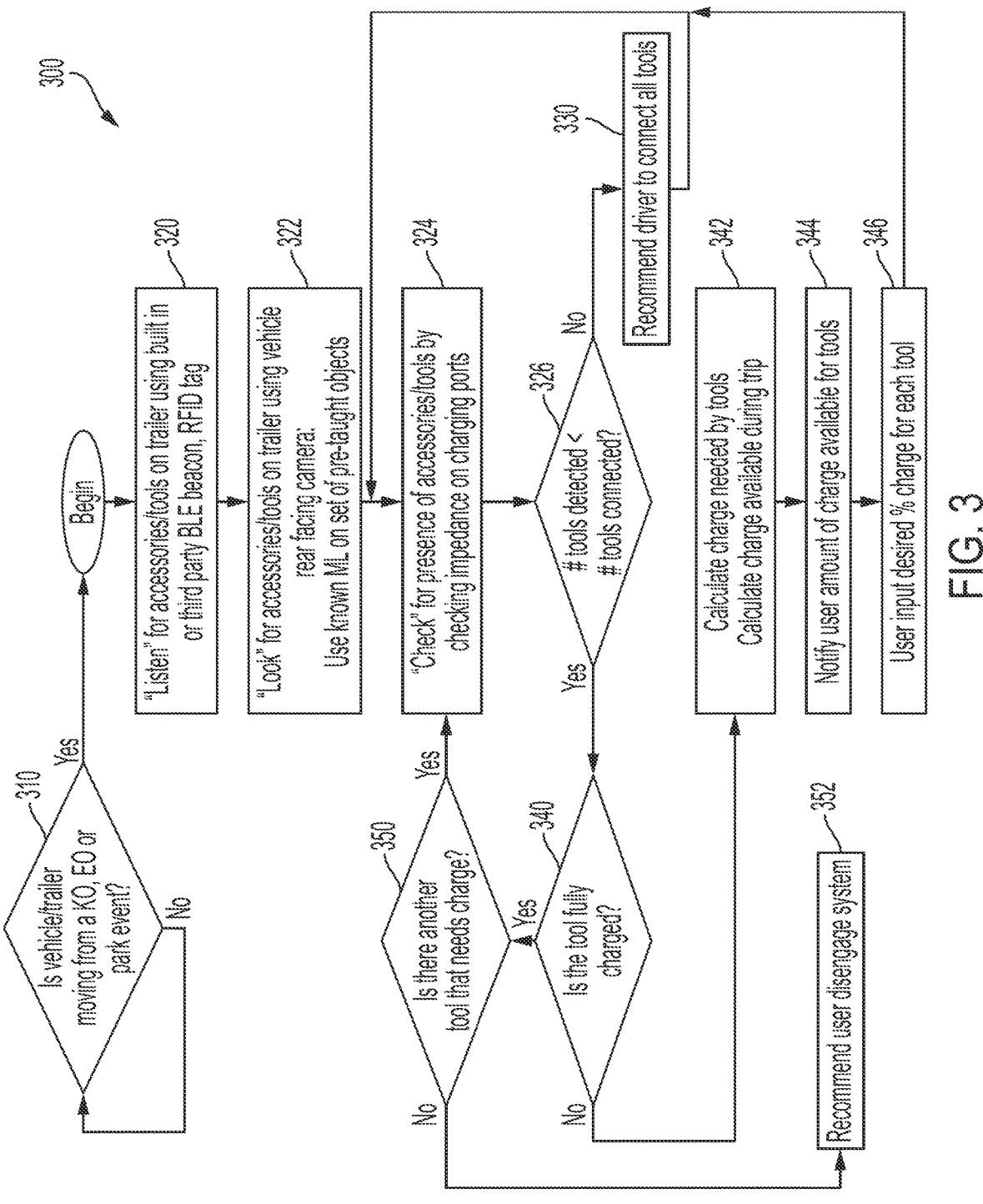
FIG. 3 illustrates operation of a system or method for controlling a vehicle towing an electrified charging trailer containing battery powered devices.

FIG. 3 illustrates operation of a system or method for controlling a vehicle towing an electrified charging trailer containing battery powered devices according to one or more embodiments. The processes, methods, or algorithms disclosed herein can be deliverable to/implemented by a processing device, processor, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as RAM devices, FLASH devices, MRAM devices and other non-transitory solid state, magnetic, or optical media. Alternatively, the processes, methods, or algorithms can be embodied in whole or in part using suitable hardware components, such as Application Specific Integrated Circuits (ASICs), Field-Programmable Gate Arrays (FPGAs), state machines, controllers, or any other hardware components or devices, or a combination of hardware, software, and firmware components. While the algorithms, processes, methods, or steps may be illustrated and/or described in a sequential matter, various steps or functions may be performed simultaneously or based on a trigger or interrupt resulting in a different sequence or order than illustrated and described. Some processes, steps, or functions may be repeatedly performed whether or not illustrated as such. Similarly, various processes, steps, or functions may be omitted in some applications or implementations.

System or method 300 detects whether the vehicle or connected trailer is moving after a key-off (KO), engine-off (EO), or park event as represented at 310. Movement may be detected by a vehicle speed sensor, GPS coordinates, accelerometer, etc. Alternatively, a key-on or engine start event may be used to initiate the system/method depending on the particular implementation. Once initiated at block 310, block 320 represents scanning or listening for battery powered devices, such as accessories, tools, or vehicles, to broadcast connection or status information via WiFi, BLE, or RFID, for example. Compatible battery powered devices may have been previously connected, coupled, or paired with the vehicle or trailer. Similarly, the vehicle and trailer controllers may have been previously connected, coupled, or paired. Once a connection is established, the vehicle controller may exchange communication information and data with the coupled or linked battery powered device in the trailer including a device ID, SOC, charging state, etc. Vehicles equipped with one or more rear facing cameras may process captured images to identify a connected trailer or battery powered devices on the trailer (for flat bed or open trailers) using known machine learning (ML) algorithms as represented at 322. Battery powered devices connected to corresponding outlets in the trailer may be detected based on comparing outlet impedance to an associated threshold as represented at 324.

Block 326 determines whether the number of detected devices is less than the number of devices connected to an associated outlet in the trailer. If NO, block 330 generates a signal that is sent to the trailer and/or vehicle HMI recommending connection of all devices to a compatible outlet with the process returning to block 324. If YES, block 340 compares the SOC for each device to an associated threshold to determine whether the device is sufficiently charged. If YES, block 350 determines whether additional devices have been detected with an SOC below a predetermined default or user-selected SOC. If NO, processing continues at block 342 to calculate the charge needed by the battery powered devices and the charge available during the current trip.

If block 350 determines that another device needs additional charging based on comparison of the device SOC to an associated default or user-designated threshold, then processing returns to block 324. Otherwise, block 352 generates a signal to disengage or disable regenerative braking in the trailer associated with charging the trailer traction battery or battery powered devices connected to the trailer outlets. Trailer regenerative braking may still be performed for opportunistic charging of the trailer traction battery when there is little or no effect on vehicle performance, or for stability control of the trailer, for example.

As previously described, block 342 calculates the charge needed by identified devices based on the current SOC, desired SOC threshold, and battery size/capacity of each device. Block 342 also calculates the charge available for the trip based on a selected trip route entered into the trip planner as previously described. The amount of charge available for the identified battery powered devices is communicated to the vehicle HMI and/or trailer HMI as represented at block 344. Block 346 prompts the user to select the desired SOC for each identified device before the process returns to block 324.

As illustrated and described with respect to FIGS. 1-3, a method for a vehicle and electrified charging trailer includes, by a vehicle controller, detecting a state of charge (SOC) of at least one battery powered device in the charging trailer being below a corresponding SOC threshold (which may be a default threshold or specified by user input), the SOC being wirelessly transmitted by the at least one battery powered device. The battery powered device may transmit the SOC to a trailer controller via an associated transceiver, and/or directly to a vehicle controller via an associated transceiver. In response to the detecting, the method includes generating a prompt on a vehicle human-machine interface (HMI) to enable charging of the at least one battery powered device, which may include enabling operating an electric machine of the trailer as a generator to charge a trailer traction battery or directly charge the battery powered device connected to an associated electrical outlet in the trailer. Of course, wireless charging of one or more of the battery powered devices may also be performed depending on the particular application or implementation. The method may also include controlling a vehicle transceiver in communication with the vehicle controller to transmit a signal disabling regenerative braking of the charging trailer in response to receiving a signal via the vehicle transceiver indicating the respective SOC's of battery powered devices in the charging trailer exceed corresponding SOC thresholds, which may be the same threshold or different thresholds for particular battery powered devices.

One or more embodiments according to the disclosure may provide associated advantages by providing a reminder to turn on and potentially connect battery powered vehicles or other devices in the trailer for charging. The system may recognize objects/vehicles needing charging in the trailer (using a BLE ID that is linked to the system, for example) and can recommend (based on wirelessly transmitted SOC of the automatically connected devices) that the power generation feature be turned on in the vehicle via a touch screen or other HMI of the vehicle and/or trailer. The system may detect whether identified devices are connected for charging (or properly positioned for wireless charging) and notify the vehicle operator. The charging system feature prompt may be triggered by detecting movement of the vehicle/trailer, closing of trailer doors, and/or automatically in response to a trip/route/destination of a connected trip planner. Automatic prompting and/or enabling and disabling of regenerative braking may be triggered in response to SOC thresholds of transported devices, opportunistic charging for current road grade, or anticipated destination, for example.

The representative embodiments described are not intended to encompass all possible forms within the scope of the claims. The words used in the specification are words of description rather than limitation, and it is understood that various changes can be made consistent with the teachings of the disclosure within the scope of the claimed subject matter. As previously described, one or more features of various embodiments can be combined to form further embodiments that may not be explicitly described or illustrated. Although embodiments that have been described as providing advantages over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to strength, durability, life cycle, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A system comprising:

a vehicle configured to tow a charging trailer;

a human-machine interface (HMI) within the vehicle;

a transceiver within the vehicle configured to receive wireless signals from battery powered devices within the charging trailer indicating associated battery states of charge (SOC); and a controller programmed to control the HMI to generate a prompt to enable regenerative braking of the charging trailer in response to SOC of one or more of the battery powered devices being below a corresponding desired SOC threshold, wherein the controller is further programmed to control the HMI to generate a prompt to disable regenerative braking of the charging trailer in response to all of the battery powered devices having an SOC exceeding the corresponding desired SOC threshold.

2. The system of claim 1 wherein the controller is further programmed to control the HMI to generate a prompt in response to detecting at least one of the battery powered devices being disconnected from an electrical outlet of the charging trailer.

* * * * *